(12) United States Patent
Skala et al.

(10) Patent No.: US 7,815,699 B2
(45) Date of Patent: Oct. 19, 2010

(54) METHOD FOR STARTING A PRIMARY REACTOR

(75) Inventors: Glenn W Skala, Churchville, NY (US); Gerald E Voecks, Fairport, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 1871 days.

(21) Appl. No.: 10/690,018

(22) Filed: Oct. 21, 2003

(65) Prior Publication Data

US 2005/0081445 A1   Apr. 21, 2005

(51) Int. Cl.
*C01B 3/36* (2006.01)
*C10J 3/46* (2006.01)
*C10J 3/54* (2006.01)
*B01J 7/00* (2006.01)
*H01M 8/06* (2006.01)
*C01B 3/00* (2006.01)

(52) U.S. Cl. .................. 48/197 R; 48/61; 48/127.9
(58) Field of Classification Search .............. 48/197 R
See application file for complete search history.

(56) References Cited

U.S. PATENT DOCUMENTS

| | | | |
|---|---|---|---|
| 4,143,620 A * | 3/1979 | Noguchi et al. ............... 123/3 |
| 4,293,315 A | 10/1981 | Sederquist | |
| 4,642,272 A | 2/1987 | Sederquist | |
| 4,650,727 A | 3/1987 | Vanderborgh et al. | |
| 4,659,634 A | 4/1987 | Struthers | |
| 4,670,359 A | 6/1987 | Beshty et al. | |
| 4,816,353 A | 3/1989 | Wertheim et al. | |
| 5,271,916 A | 12/1993 | Vanderborgh et al. | |
| 5,316,871 A | 5/1994 | Swathirajan et al. | |
| 5,484,577 A | 1/1996 | Buswell et al. | |
| 5,518,705 A | 5/1996 | Buswell et al. | |
| 5,637,415 A | 6/1997 | Meltser et al. | |
| 5,741,474 A | 4/1998 | Isomura et al. ............. 423/652 |
| 6,083,425 A | 7/2000 | Clawson et al. ............. 423/652 |
| 6,126,908 A | 10/2000 | Clawson et al. | |
| 6,132,689 A | 10/2000 | Skala et al. | |
| 6,165,633 A * | 12/2000 | Negishi ..................... 429/17 |

(Continued)

FOREIGN PATENT DOCUMENTS

DE    19955929 A1 *   6/2001

(Continued)

OTHER PUBLICATIONS

M.J. Hall et al., "A Porous Media Burner for Reforming Methanol for Fuel Cell Powered Electric Vehicles," SAE Paper #950095, International Congress and Exposition, Detroit, Michigan, Feb. 27-Mar. 2, 1995.

*Primary Examiner*—Alexa D Neckel
*Assistant Examiner*—Matthew J Merkling
(74) *Attorney, Agent, or Firm*—Harness, Dickey & Pierce, P.L.C.

(57) ABSTRACT

A preferred method for starting a primary reactor of a fuel cell system includes performing lean combustion within the primary reactor during a first phase of a start sequence and autothermal reforming during a second phase of the start sequence. In another aspect of the present invention, partial oxidation is performed within the primary reactor during the first phase of the start sequence and autothermal reforming is performed during the second phase of the start sequence.

29 Claims, 4 Drawing Sheets

U.S. PATENT DOCUMENTS

| | | | |
|---|---|---|---|
| 6,254,807 B1 | 7/2001 | Schmidt et al. | 423/652 |
| 6,268,075 B1 | 7/2001 | Autenrieth et al. | |
| 6,290,877 B2 * | 9/2001 | Naka et al. | 252/373 |
| 6,294,149 B1 | 9/2001 | Autenrieth et al. | 423/652 |
| 6,383,468 B1 | 5/2002 | Schussler et al. | 423/651 |
| 6,403,049 B1 | 6/2002 | Van Keulen et al. | |
| 6,521,204 B1 * | 2/2003 | Borup et al. | 423/652 |
| 6,562,499 B1 | 5/2003 | Naka et al. | |
| 7,037,349 B2 * | 5/2006 | Dauer et al. | 48/214 A |
| 7,261,750 B1 * | 8/2007 | Autenrieth et al. | 48/198.1 |
| 2001/0014764 A1 | 8/2001 | Brocker et al. | |
| 2004/0028964 A1 * | 2/2004 | Smaling | 429/19 |
| 2004/0131540 A1 * | 7/2004 | Fujii et al. | 423/650 |
| 2005/0089732 A1 * | 4/2005 | Aoyama et al. | 429/20 |

FOREIGN PATENT DOCUMENTS

| | | |
|---|---|---|
| EP | 0 710 996 B1 | 1/1995 |
| EP | 0 941 963 A1 | 9/1999 |
| EP | 0 989 621 A2 | 3/2000 |
| JP | 2000-335904 A | 12/2000 |
| WO | WO 98/08771 | 3/1998 |

* cited by examiner

METHOD FOR STARTING A PRIMARY REACTOR

FIELD OF THE INVENTION

The present invention relates to fuel cells, and more particularly to a method for starting a primary reactor.

BACKGROUND OF THE INVENTION

Fuel cells are increasingly being used as a power source in a wide variety of different applications. Fuel cells have been proposed for use in automotive vehicles as a replacement for internal combustion engines. In proton exchange membrane (PEM) type fuel cells, hydrogen is supplied to an anode of the fuel cell and oxygen is supplied as an oxidant to a cathode. The fuel cell converts the chemical energy in the hydrogen to electrical power to charge capacitors or batteries or to directly power a device such as an electric motor.

For vehicle applications, it is desirable to use a liquid fuel, such as methanol (MeOH), gasoline, diesel, and the like, as the source of the hydrogen. Such fuels are readily available and may be conveniently stored onboard the vehicle. Fuel cells, however, cannot use the liquid fuel most efficiently without processing, via some method of dissociation, to release the hydrogen from the fuel. The dissociation reaction typically takes place within a primary reactor, which is part of the fuel cell's fuel processor. The primary function of the fuel processor is to provide a controlled hydrogen-rich stream to the fuel cell. The fuel processor produces a reformate stream that is composed primarily of hydrogen, carbon dioxide, nitrogen, water, methane and trace amounts of carbon monoxide.

The fuel processor's primary reactor has a catalyst mass for producing a reformate gas comprising primarily hydrogen and carbon dioxide. Known methods for producing the reformate include partial oxidation, steam reforming, and a combination of the two processes referred to as autothermal reforming. Partial oxidation is an exothermal reaction that produces hydrogen, carbon monoxide and heat as byproducts of reacting liquid fuel with oxygen. Steam reforming is a endothermic reaction that produces hydrogen and carbon monoxide as byproducts of reacting liquid fuel with water, which is typically in the form of steam. Autothermal reforming combines partial oxidation with steam reforming through multiple reactions.

Two important considerations when using fuel cells to power automotive vehicles is (1) the time required to start the fuel cell's fuel processor and (2) how efficient the fuel processor is at producing hydrogen. Automotive drivers are accustomed to simply turning a key and immediately being on their way. There is generally no need to wait for a conventional internal combustion engine, which power the vast majority of modern automotive vehicles, to reach a certain operating temperature before proceeding. Unfortunately, the same is not always true for vehicles powered by fuel cells. The time required to start the fuel processor may be quite significant depending on the particular process that is used to produce the hydrogen. To further complicate matters, the hydrogen producing process that has the best start-up characteristics is generally the least efficient at producing hydrogen.

Typically, the fuel processor subsystem in the fuel cell system has a "warm-up period" during which the vehicle can only be operated at a significantly reduced power or not at all. This is due to the fact that certain processes, such as steam reforming, will not begin producing hydrogen until after the reactor's catalyst bed has reached a certain minimum temperature. Steam reforming is an endothermic reaction that requires heat input for the reaction to occur. Because the reaction is endothermic, the heat must be supplied from an external source. Depending on how efficient the heat transfer is, this process can significantly affect the time required to reach the minimum temperature required for steam reforming to occur. As a result, steam reforming exhibits slower transient and startup response characteristics than either partial oxidation or autothermal reforming which are both exothermic. Steam reforming, however, can be more efficient than either partial oxidation or autothermal reforming in terms of producing hydrogen.

In contrast to steam reforming, partial oxidation has significantly better transient and startup response characteristics. This is due in part to the fact that partial oxidation is an exothermic reaction that generates its own heat. Partial oxidation, however, is considerably less efficient at producing hydrogen than steam reforming.

The performance characteristics of autothermal reforming fall somewhere between partial oxidation and steam reforming. Autothermal reforming has better transient and startup characteristics than steam reforming, but not as good as partial oxidation, and is more efficient at producing hydrogen than partial oxidation, but not as efficient as steam reforming can be.

Of the three processes—partial oxidation, steam reforming, and autothermal reforming—partial oxidation provides the best start-up transients and steam reforming is the most efficient at producing hydrogen. To take advantage of the benefits of both processes, it is desirable to develop a method for starting a steam reforming reactor that exhibits the good transient and startup characteristics of partial oxidation while also enabling the high hydrogen production efficiency of steam reformation during normal operation.

SUMMARY OF THE INVENTION

In accordance with the present invention, a preferred method for starting a primary reactor of a fuel cell system includes performing lean combustion within the primary reactor during a first phase of a start sequence and autothermal reforming during a second phase of the start sequence. In another aspect of the present invention, partial oxidation is performed within the primary reactor during the first phase of the start sequence and autothermal reforming is performed during the second phase of the start sequence. In yet another aspect of the present invention, an air-fuel mixture having an air-fuel ratio greater than stoichiometric (combustion) at the beginning of the start sequence and less than stoichiometric (combustion) at the end of the start sequence is supplied to the primary reactor, wherein the fuel is oxidized by means of combustion. Still another aspect of the present invention includes allowing the air flow being supplied to the primary reactor to vary in response to the magnitude of the total pressure within the primary reactor.

The method for starting a primary reactor disclosed in the present invention is advantageous in that the method enables the primary reactor to reach an operating temperature and pressure necessary for steam reforming more quickly than when using conventional methods. Furthermore, allowing the air flow rate to vary in response to a change in magnitude of the total pressure within the primary reactor permits a smoother transition between the various phases of the start sequence as well as transitioning from the start sequence to a run mode. Additional advantages and features of the present invention will become apparent from the following description and appended claims, taken in conjunction with the accompanying drawings. It should be understood that the detailed description with specific examples, while indicating a preferred embodiment of the invention, are intended for illustrative purposes only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
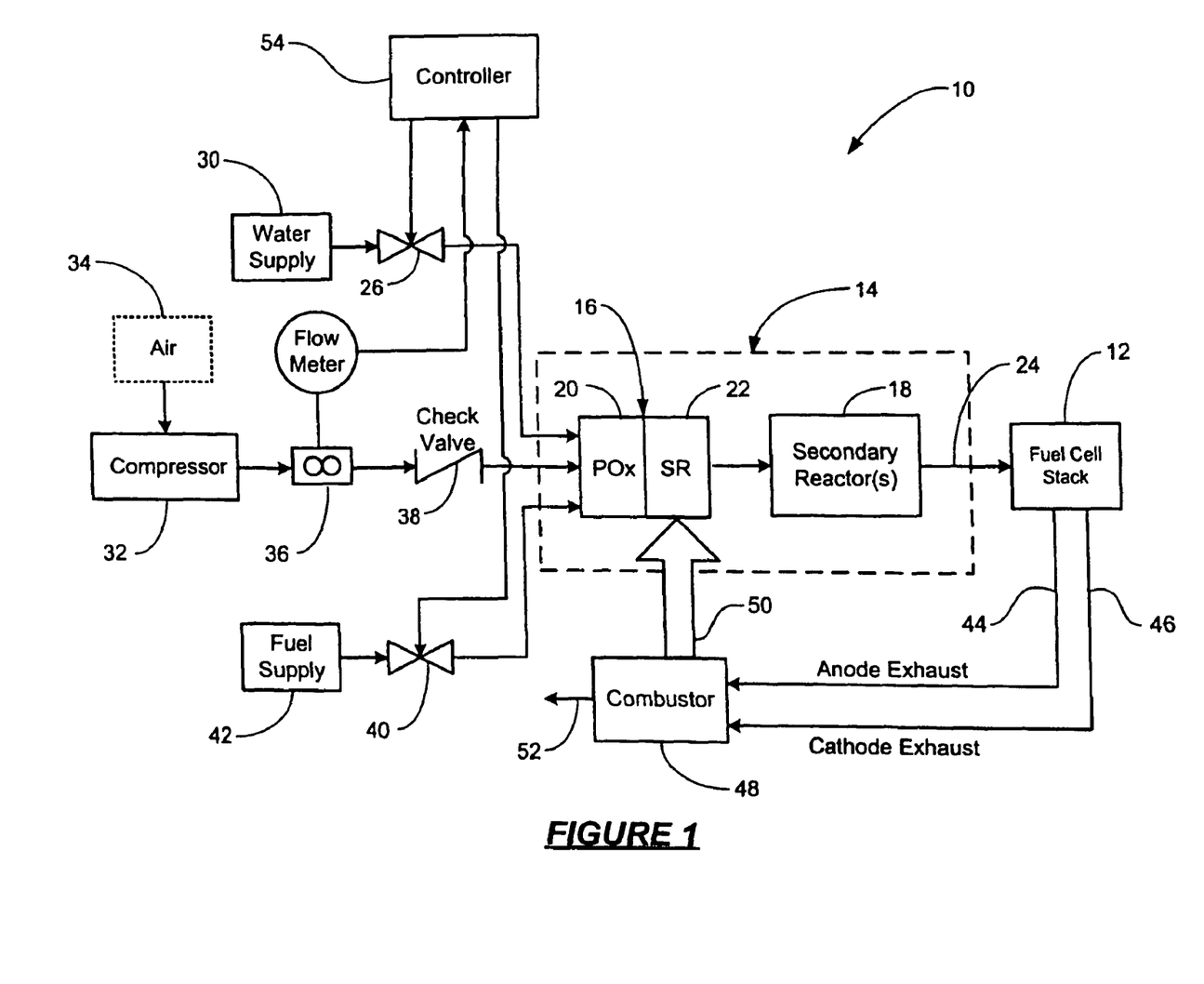
FIG. 1 is a block diagram of an exemplary fuel cell system that includes an autothermal reforming reactor that is started in accordance with the present invention.

Referring to FIG. 1, a block diagram of a fuel cell system 10 is illustrated. Fuel cell system 10 includes a fuel cell stack 12 that includes at least one fuel cell assembly (not shown). A fuel processor 14 is comprised of a primary reactor 16 and one or more secondary reactors 18. Primary reactor 16 is preferably comprised of two reaction sections. A first section 20 primarily supports a partial oxidation reaction and a second section 22 primarily supports steam reforming. The details of the two reactor sections is discussed in more detail subsequently. Secondary reactors 18 include at least one of a water-gas shift (WGS) reactor and a preferential oxidation (PrOx) reactor. Fuel processor 14 produces a reformate stream 24, that is supplied to fuel stack 12.

A water metering device 26 controls the supply of water 30 to primary reactor 16. A compressor 32 supplies air 34 to the primary reactor 16. Although air will preferably be used as an oxidant in fuel processor 14, other oxidants capable of supporting the reforming processes may also be used. The amount air that compressor 32 supplies to primary reactor 16 will vary depending on the pressure level within primary reactor 16. As the pressure level in primary reactor 16 increases, the pressure drop between compressor 32 and primary reactor 16 decreases, which in turn reduces the amount of air supplied by compressor 32 to primary reactor 16 at a constant compressor operation. When the pressure level in primary reactor 16 exceeds the pressure capability of compressor 32, compressor 32 ceases supplying air to the primary reactor. A check valve 38 is located between compressor 32 and the fuel processor 14 to prevent backflow from primary reactor 16 into compressor 32 in instances where the pressure level in primary reactor 16 exceeds the pressure capability of compressor 32.

An airflow meter is located between compressor 32 and check valve 38. Airflow meter 36 functions to continuously monitor the amount of air 34 that compressor 32 is supplying to primary reactor 16. The resulting data is forwarded by conventional means to controller 54 where it is used by the controller to determine the appropriate amount of water and fuel that is to be supplied to reactor 16 at any given time.

A fuel metering device 40 controls the supply of fuel 42 to the fuel processor 14. Fuel supply 42 may consist of methanol, gasoline, diesel, or other suitable fuel.

Excess reformate is discharged from fuel stack 12 in the form of an anode exhaust 44 and a cathode exhaust 46. The exhaust from the anode and cathode is supplied to a combustor 48, wherein the excess hydrogen, and other combustible compounds, are oxidized by combustion. A conventional heat exchanger (not shown) extracts heat 50 from the combustion gases produced in combustor 48 for use by primary reactor 16. Exhaust gasses from combustor 48 are discharged through an exhaust system 52.

A controller 54 is connected in a conventional manner to water metering device 26, air flow meter 36, and the fuel metering device 40. Controller 54 monitors the air flow rate from compressor 32 as measured by flow meter 36. Based on the air flow data supplied by flow meter 36, controller 54 adjusts the amount of fuel 42 and water 30 supplied to primary reactor 16 by sending a suitable control signal to water metering device 26 and fuel metering device 40.

Figure 2:
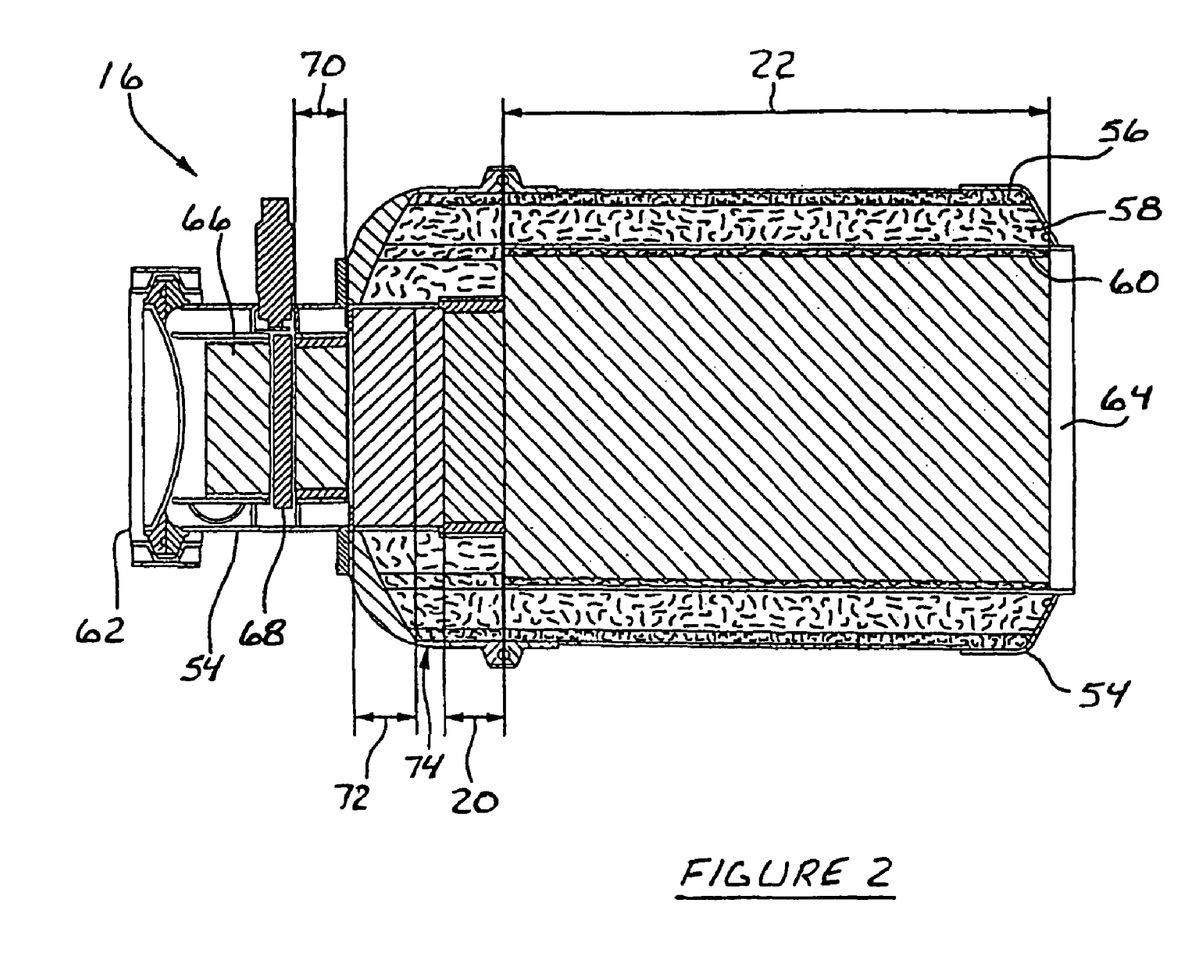
FIG. 2 is a sectional view of an exemplary autothermal reforming reactor.

Referring to FIG. 2, there is shown a cross-sectional view of an exemplary primary reactor that supports both partial oxidation and steam reforming. Primary reactor 16 is comprised of a housing 54 that is lined with multiple layers of insulation 56, 58, 60. Primary reactor 16 has an inlet 62 for receiving the various reactants, which will include fuel and at least one of air and water. Primary reactor 16 has an outlet 64 through which hot combustion gases and/or a hydrogen rich reformate is discharged. A first bed of gas mixing and distribution foam 66 is positioned downstream and adjacent to inlet 62. This first section 66 is preferably comprised of a ceramic foam type media. Mixing section 66 acts as a mixer for homogenizing the reactants entering primary reactor 16.

An electric heating element 68 is positioned downstream of mixing section 66 and serves to preheat the reactants (fuel, air, and water) entering primary reactor 16. Heating element 68 may or may not be catalyzed and is electrically energized by conventional means. Downstream of electric heater 68 is a second mixing and distribution foam bed 70. Mixing section 70 serves to further mix the reactants.

The diameter of housing 54 is enlarged after mixing section 70. A third mixing and distribution foam bed 72 is positioned downstream and adjacent to mixing bed 70. Mixing section 72 is constructed of a material that is similar to that used for mixing section 70. The increased flow area of mixing section 72 causes a reduction in the velocity of the gaseous reactants.

A flame suppressing bed 74 is positioned downstream and adjacent to mixing section 72. Flame suppressor 74 is preferably constructed of a ceramic foam material similar to that used for mixing section 72, but has a greater pore density than mixing section 72. The greater pore density increases the velocity of the reactants passing though section 74. The higher velocity causes section 74 to function as a flame suppressor, which prevents ignition and flashback from the downstream to the upstream sections of primary reactor 16.

Positioned downstream and adjacent to section 74 is a partial oxidation catalyst bed 20. Catalyst bed 20 is used to react fuel and air to form a hot combustion gas stream. This process is commonly referred to as partial oxidation (POx). A second catalyst bed 22 is positioned downstream of catalyst bed 20. Catalyst bed 22 is used to react fuel and steam to form a hydrogen rich reformate stream. This process is commonly known as steam reformation. As previously mentioned, steam reformation is an endothermic reaction that requires an external heat source to proceed. Some, if not all, of the heat will be supplied from the POx reaction occurring in catalyst bed 20.

Primary reactor 16 preferably supports both partial oxidation (POx) and steam reforming. The two processes may occur simultaneously, commonly known as autothermal steam reforming, or independently. In autothermal reforming, the POx reaction primarily takes place in section 20 of primary reactor 16, while steam reformation primarily occurs in section 22. It should be understood, however, that there is some overlap in the type of reaction that occurs in the POx and steam reforming sections (sections 20 and 22 respectively) of primary reactor 16.

POx implies a reaction that is predominantly between fuel and air. Steam reformation, on the other hand, implies a reaction that is predominantly between fuel and water. In those instances in which fuel, air and water (steam) are simultaneously supplied to reactor 16, the POx and steam reforming reactions together comprise an autothermal reaction. When operating primary reactor 16 as an autothermal reactor, the predominantly POx reaction is exothermic and the predominantly steam reforming reaction is endothermic. The heat generated during the POx reaction is carried downstream into catalyst bed 22, where the steam reformation reaction takes place.

During normal operation, fuel reacts exothermally with a rich air/fuel mixture (i.e., a sub-stoichiometric (combustion) amount of air) in POx catalyst 20 to produce carbon monoxide, hydrogen and lower hydrocarbons such as methane. The hot POx combustion stream, along with the water (steam) from water supply 30, flows into steam reforming catalyst 22, where the lower hydrocarbons react with the steam to produce a reformate gas that is comprised principally of carbon dioxide, carbon monoxide, hydrogen, nitrogen, water, and methane. The steam reforming reaction is endothermic. Some or all of the heat required for the steam reforming reaction is furnished from the heat generated by the exothermic POx reaction. The heat is carried with the POx affluent from catalyst bed 20 into the steam reforming catalyst 22. If necessary, heat 50 from combustor 48 may be used to supplement the heat generated by the Pox reaction.

Figure 3:
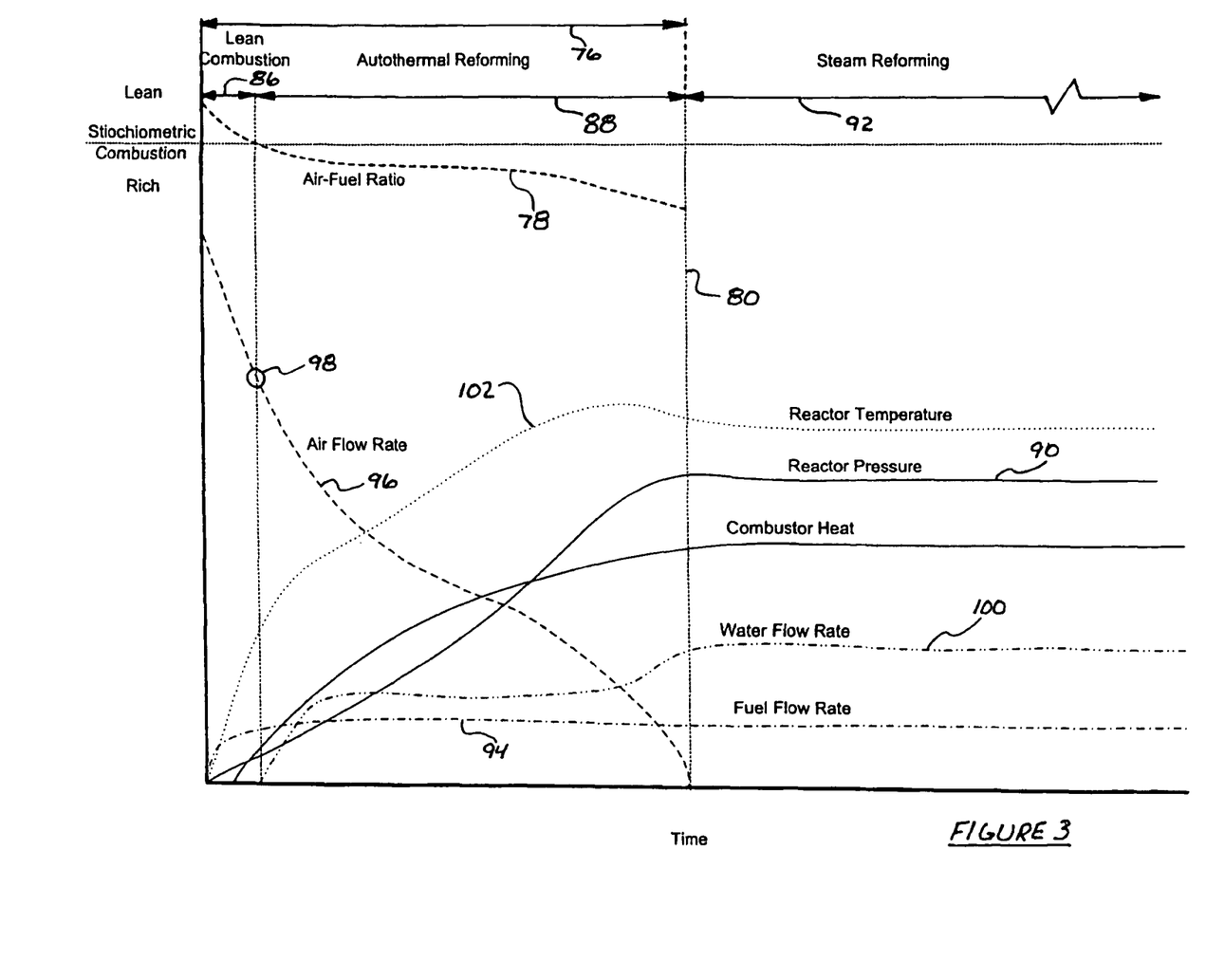
FIG. 3 is a graph illustrating the transient characteristics of various fuel cell system operating parameters during a lean start.
Figure 4:
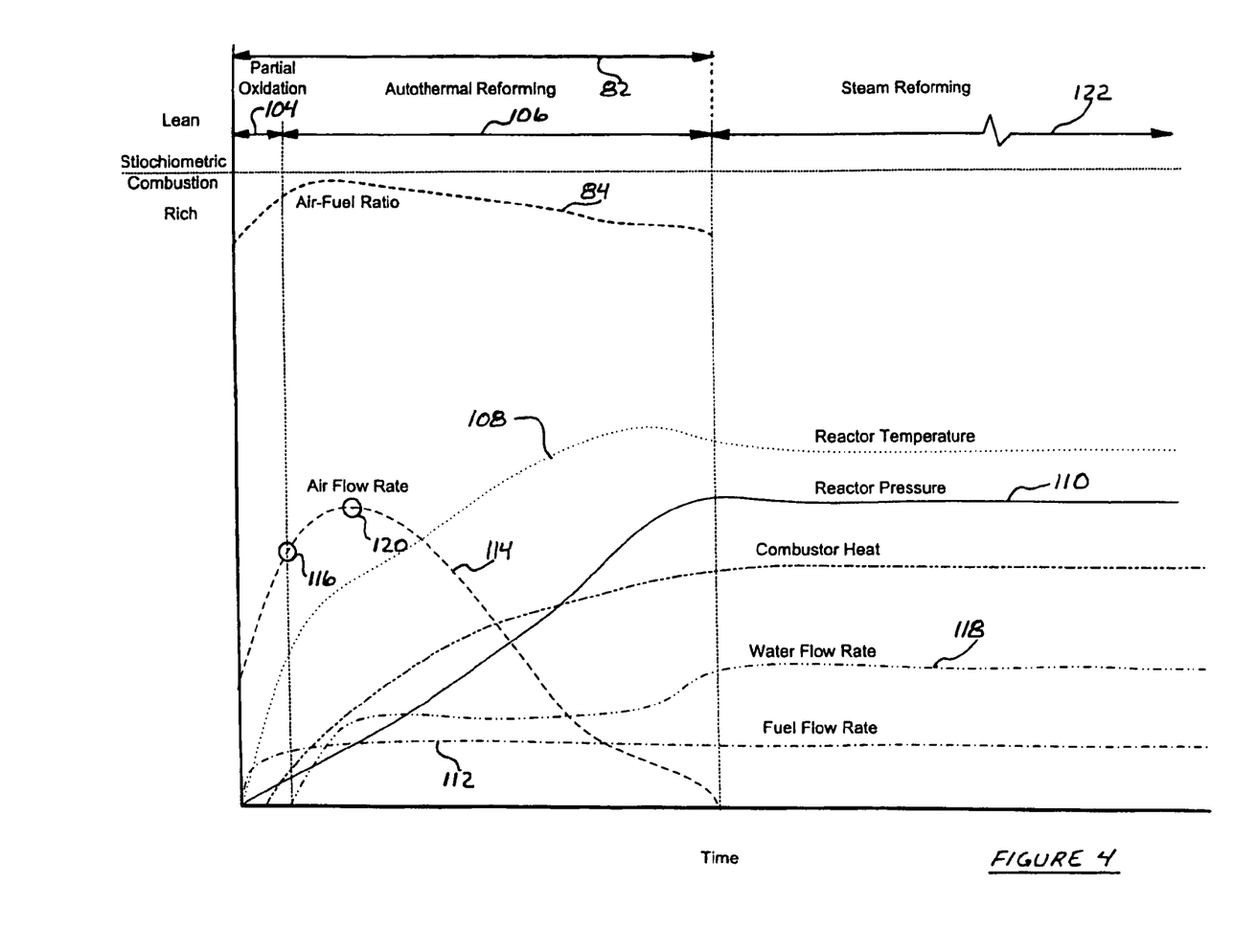
FIG. 4 is a graph illustrating the transient characteristics of various fuel cell system operating parameters during a rich start.

In accordance with the present invention, primary reactor 16 may undergo a lean start or a rich start. A lean start involves starting primary reactor 16 using an initially lean air-fuel mixture. FIG. 3 graphically illustrates the transient characteristics of various fuel system operating parameters during an exemplary lean start sequence 76. As shown in FIG. 3, the air-fuel ratio (curve 78) at the beginning of the lean start sequence (time=0) preferably begins at a ratio greater than stoichiometric (combustion) (i.e., lean air-fuel ratio), and progressively decreases to a sub-stoichiometric ratio (i.e., rich air-fuel ratio) at the end of the start sequence (denoted by line 80). Conversely, a rich start involves starting primary reactor 16 using an air-fuel ratio that is initially a rich air-fuel ratio. FIG. 4 graphically illustrates the transient characteristics of the same operating parameters shown in FIG. 3 during an exemplary rich start sequence 82. As shown in FIG. 4, the air-fuel ratio (curve 84) at the beginning of the rich start sequence (time=0) preferably starts at a ratio less than stoichiometric and remains sub-stoichiometric throughout the rich start sequence.

Referring again to FIG. 3, the lean start sequence 76 preferably is comprised of two phases; a lean combustion phase 86 and an autothermal reforming phase 88. During the lean combustion phase 86, controller 54 sends a control signal to fuel control device 40, instructing the device to supply primary reactor 16 with fuel 42 at a flow rate that will provide the desired lean air-fuel ratio. To achieve the proper air-fuel mixture required for lean combustion, compressor 32 is preferably started and allowed to run until the airflow exiting compressor 32 has stabilized, at which time the lean combustion process is initiated. Controller 54 monitors, by means of flow meter 36, the air flow rate from compressor 32. Once compressor 32 is operating at a maximum flow rate, controller 54 initiates the lean combustion process by sending a control signal to fuel control device 40 instructing the device to supply primary reactor 16 with fuel 42 at the predetermined flow rate required for lean combustion. Alternatively, the fuel $H_2$ flow can be regulated by fuel control device 40 to provide the amount of fuel commensurate with the desired air-fuel ratio and the air delivery rate from compressor 32. This may reduce starting time.

The air flow rate from compressor 32 is preferably not regulated and is allowed to fluctuate in response to changes in the magnitude of the total pressure within reactor 16. As shown in FIG. 3, the pressure level within primary reactor 16 (curve 90) progressively increases throughout the lean start sequence. Increasing the total pressure within primary reactor 16 causes a corresponding decrease in the pressure drop between compressor 32 and primary reactor 16. The amount of air flowing from compressor 32 to primary reactor 16 is directly proportional to the drop in total pressure between the two components. Consequently, decreasing the pressure drop between compressor 32 and primary reactor 16 causes a proportional decrease in the amount of air being supplied to primary reactor 16 at a constant compressor operating point. Because the internal pressure within primary reactor 16 is increasing throughout the start sequence, the amount of air being supplied to primary reactor 16 from compressor 32 continues to decrease until the flow rate reaches substantially zero. This also represents the point at which the start sequence ends and primary reactor 16 begins operating in a run mode 92.

As shown in FIG. 3, after an initial ramp-up, the fuel flow rate (curve 94) is preferably held constant for the duration of the lean start sequence 76. Because the airflow decreases during the start sequence (curve 96), holding the fuel flow constant causes the air-fuel ratio (curve 78) to progressively decrease from a lean air-fuel mixture at the beginning of the start sequence, to a rich air-fuel mixture at the end of the start sequence. As the air-fuel ratio approaches stoichiometric, the lean combustion process 86 substantially ceases and the lean start sequence 76 transitions to the autothermal reforming phase 88.

The autothermal reforming phase 88 is comprised of a partial oxidation process and a steam reforming process, both of which occur simultaneously, but within different sections of reactor 16. Referring again to FIGS. 1 and 2, the partial oxidation process primarily occurs in catalyst bed 20, while the steam reforming process primarily occurs in catalyst bed 22. Partial oxidation is an exothermic reaction that reacts fuel with air to produce hydrogen, carbon monoxide and heat. Steam reforming, on the other hand, is an endothermic reaction that combines fuel, water and heat to form hydrogen and carbon monoxide. A substantial portion of the heat produced by the partial oxidation is used in the steam reforming process and to heat catalyst bed 22.

Referring again to FIG. 3, when the air flow rate from compressor 32 drops to a level at which the air-flow ratio is nearly stoichiometric 98, controller 54 sends a control signal to water metering device 26, instructing the device to begin supplying water 30 to primary reactor 16 at a predetermined flow rate. As shown in FIG. 3, the water flow rate (curve 100) increases to a predetermined level during the autothermal reforming phase 88 of the lean start sequence, and the flow rate remains relatively constant throughout the remainder of the start sequence.

As the autothermal reforming phase 88 of the lean startup sequence 76 continues to proceed, the temperature (curve 102) and pressure (curve 90) within primary reactor 16 continues to increase while the air flow (curve 96) from compressor 32 continues to decrease. When the pressure within reactor 16 reaches the maximum pressure capability of compressor 32, compressor 32 will cease supplying air to primary reactor 16. Without air, the partial oxidation reaction can no longer occur and the autothermal reforming process substantially comes to an end. Consequently, when the air flow rate from compressor 32 drops to substantially zero, the startup sequence is completed and primary reactor 16 transitions to a run mode 92, wherein primary reactor 16 functions primarily as a steam reforming reactor.

It is important to note that the curves shown in FIG. 3 are merely exemplary and are not derived from actual data. The curves are only intended to illustrate the relative relationship between the various parameters during the start sequence and the relative timing of certain events, such as when to begin supplying water to the primary reactor. In practice, however, the actual shape of any given curve may differ significantly from that which is shown in FIG. 3.

Referring again to FIG. 4, the rich start sequence 82 preferably is comprised of two phases; a partial oxidation phase 104 and an autothermal reforming phase 106. The partial oxidation phase 104 occurs at the beginning of the rich start sequence when the temperature (curve 108) and pressure (curve 110) with primary reactor 16 have not yet reached a minimum level necessary for steam reforming to occur. However, once the temperature and pressure within primary reactor 16 reach a level sufficient to support autothermal reforming, steam reforming will begin to occur and the partial oxidation phase 104 will transition to the autothermal reforming phase 106.

Heat from the partial oxidation phase 104 is used to heat the reactor 16 to a temperature sufficient to support autothermal reforming. The amount of heat that is produced through partial oxidation is generally less than that which can be produced through lean combustion. As a result, reactor 16 may tend to heat up somewhat slower during a rich start 82 than a lean start 76, which is reflected in the temperature curves shown in FIGS. 3 and 4 (curves 102 and 108 respectively).

Continuing to refer to FIG. 4, the rich start sequence 82 is preferably initiated by starting compressor 32 at substantially the same time that controller 54 sends a control signal to fuel control device 40 instructing the device to begin supplying primary reactor 16 with fuel 42 at a predetermined flow rate. When compressor 32 first starts operating (time=0), the pressure rise across compressor 32 is relatively low, and consequently very little air is being supplied to primary reactor 16. As compressor 32 continues to operate, the pressure rise across compressor 32 increases, which in turn increases the amount of air being supplied to primary reactor 16. During the same time period, the fuel flowing through metering device 40 reaches the flow rate commanded by controller 54 relatively quickly as illustrated by curve 112. As a consequence, the air-fuel ratio (curve 84) during the partial oxidation phase 104 of the rich start sequence 82 continues to increase until the air flow rate from compressor 32 reaches a maximum during the autothermal reforming phase.

Continuing to refer to FIG. 4, when the air flow rate (curve 114) from compressor 32 reaches a predetermined level (point 116 on curve 114), controller 54 sends a control signal to water metering device 26, instructing the device to begin supplying water 30 to primary reactor 16 at a predetermined flow rate. As illustrated by curve 118, the water flow rate increases to a predetermined level during the autothermal reforming phase 106 of the rich start sequence 82, and remains relatively constant until the end of the rich start sequence.

As was the case with the lean start sequence shown in FIG. 3, the airflow rate from compressor 32 is preferably not regulated during the rich start sequence and is allowed to fluctuate in response to changes in the magnitude of the total pressure within reactor 16. As shown in FIG. 4, the pressure level within primary reactor 16 (curve 110) progressively increases throughout the rich start sequence, and continues to increase beyond the point where the pressure rise across compressor 32 reaches a maximum (point 120 on curve 114). Once the pressure rise across compressor 32 reaches its maximum, any increase in the pressure level within primary reactor 16 causes a corresponding decrease in the pressure drop between compressor 32 and primary reactor 16. Since the air flow rate between compressor 32 and primary reactor 16 is directly proportional to pressure drop between the two components, decreasing the pressure drop between compressor 32 and primary reactor 16 causes a proportional decrease in the amount of air being supplied to primary reactor 16. As the internal pressure within primary reactor 16 continues to increase, the amount of air being supplied to primary reactor 16 from compressor 32 decrease until the flow rate reaches substantially zero. This represents the point at which the rich start sequence ends and primary reactor 16 begins operating in a run mode 122.

As illustrated by curve 112 of FIG. 4, after an initial ramp-up, the fuel flow rate is preferably held constant for the duration of the rich start sequence 82. Once the pressure rise across compressor 32 reaches its maximum (point 120 on curve 114), the amount of air being supplied to primary reactor 16 begins to decrease. As the autothermal reforming phase 106 of the rich start sequence continues to proceed, the temperature (curve 108) and pressure (curve 110) within primary reactor 16 continues to increase while the air flow (curve 114) from compressor 32 decreases. The decreased airflow causes a corresponding decrease in the air-fuel ratio (curve 84). Decreasing the air-fuel ratio necessarily results in less fuel being consumed through partial oxidation, which increases the amount of fuel available for steam reforming. When the pressure within reactor 16 reaches the maximum pressure capability of compressor 32, the compressor will substantially cease supplying air to primary reactor 16. Without air, the partial oxidation reaction can no longer occur and the autothermal reforming process substantially comes to an end. Consequently, when the amount of air being supplied to primary reactor 16 drops to substantially zero, the startup sequence 82 is completed and primary reactor 16 transitions to a run mode 122. While operating in the run mode, primary reactor 16 functions primarily as a steam reforming reactor.

It is important to note that the curves shown in FIG. 4 are merely exemplary and are not derived from actual data. The curves are only intended to illustrate the relative relationship between the various parameters during the rich start sequence and the relative timing of certain events, such as when to begin supplying water to the primary reactor. In practice, however, the actual shape of any given curve may differ significantly from that which is shown in FIG. 4.

The foregoing description of the present invention is merely exemplary in nature and, thus, variations that do not depart from the gist of the invention are intended to be within the scope of the invention. Such variations are not to be regarded as a departure from the spirit and scope of the invention.

What is claimed is:

1. A method of operating a primary reactor during a start sequence having a beginning and an end, which steps comprise:

performing lean combustion within the primary reactor during a first phase of the start sequence, wherein the first phase has a beginning and an end, and wherein the air flow rate at the beginning of the first phase is greater than the air flow rate at the end of the first phase, and wherein the air flow rate continuously decreases throughout the first phase of the start sequence; and performing autothermal reforming within the primary reactor during a second phase of the start sequence, wherein the second phase has a beginning and an end, and wherein the step of performing lean combustion within the primary reactor during the first phase of the start sequence further comprises the steps of:

supplying a stream of air to the primary reactor from a compressor, initially at a maximum flow rate of the compressor, wherein the flowrate of air fluctuates in response to changes in the magnitude of the total pressure within the primary reactor;

supplying a stream of fuel to the primary reactor at a flow rate predetermined to produce an air to fuel ratio equal to or greater than stoichiometric;

mixing the air and fuel streams together to form a combustible air-fuel mixture; and combusting the air-fuel mixture within the primary reactor.

2. The method of claim 1, wherein the maximum airflow rate occurs at the beginning of the first phase.

3. The method of claim 1, wherein the air-fuel ratio is substantially stoichiometric at the end of the first phase of the start sequence.

4. The method of claim 1, wherein the air-fuel ratio is equal to or greater than stoichiometric throughout the entire first phase of the start sequence.

5. The method of claim 1, wherein the air flow rate varies in direct proportion to a pressure drop between the compressor and the primary reactor.

6. The method of claim 1, wherein an increase in total pressure within the primary reactor causes a corresponding decrease in the air flow rate.

7. The method of claim 1, wherein the step of performing autothermal reforming within the primary reactor during a second phase of the start sequence further comprises the steps of:

supplying respective streams of air, steam, and fuel to the primary reactor at respective flow rates; and performing steam reformation within the primary reactor.

8. The method of claim 7, wherein the minimum air flow rate occurs at the end of the second phase.

9. The method of claim 7, wherein the airflow rate at the end of the second phase is substantially zero.

10. The method of claim 7, wherein water is continuously supplied to the primary reactor throughout the second phase of the start sequence.

11. The method of claim 7, wherein the water flow rate varies during the second phase of the start sequence.

12. The method of claim 7, wherein a ratio of air to fuel is substantially zero at the end of the second phase of the start sequence.

13. The method of claim 7, wherein a ratio of air to fuel is substantially stoichiometric at the beginning of the second phase.

14. The method of claim 7, wherein the air flow rate varies in inverse proportion to a change in the total pressure within the primary reactor.

15. The method of claim 7, wherein an increase in total pressure within the primary reactor causes a corresponding decrease in the air flow rate.

16. The method of claim 1, wherein the fuel comprises one or more hydrocarbons.

17. The method of claim 1, wherein the beginning of the first phase substantially corresponds with the beginning of the start sequence.

18. The method of claim 1, wherein the end of the second phase substantially corresponds with the end of the start sequence.

19. The method of claim 1, wherein the end of the first phase substantially corresponds with the beginning of the second phase.

20. A method of operating an autothermal reactor during a start sequence having a beginning and an end, which steps comprise:

supplying a stream of air to the primary reactor initially at a minimum flow rate from an air supply apparatus and flowing at an unregulated flow rate, the air flow rate varying in direct proportion to a pressure drop between the air supply apparatus and the primary reactor until the flow rate reaches substantially zero when the reactor pressure exceeds a maximum pressure of the air supply apparatus;

determining a fuel flow rate, based on the air flow rate, that produces an air-fuel ratio less than stoichiometric;

mixing the air and fuel streams together in said less than stoichiometric air-fuel ratio to form a combustible air-fuel mixture;

combusting the air-fuel mixture within the autothermal reactor;

supplying a stream of water to the autothermal reactor at a predetermined flow rate; and reacting the water and fuel together within the autothermal reactor to create a reformate stream comprised of hydrogen, wherein the airflow rate increases after the start sequence begins and the maximum air flow rate occurs after the start sequence begins and before the start sequence ends.

21. The method of claim 20, wherein the air flow rate at the beginning of the start sequence is greater than the air flow rate at the end of the start sequence.

22. The method of claim 20, wherein the minimum air flow rate occurs at the end of the start sequence.

23. The method of claim 20, wherein the air flow rate increases over a first segment of the start sequence and decreases over a second segment of the start sequence.

24. The method of claim 20, wherein the airflow rate at the end of the start sequence is substantially zero.

25. The method of claim 2, wherein the fuel flow rate varies during the start sequence.

26. The method of claim 20, wherein the air-fuel ratio is substantially zero at the end of the start sequence.

27. The method of claim 20, wherein the air-fuel ratio is less than stoichiometric throughout the entire start sequence.

28. The method of claim 20, wherein the step of supplying a stream of water is commenced only after the reactor has reached a temperature to sustain autothermal reforming.

29. The method of claim 20, wherein the fuel is selected from the group consisting of gasoline, methanol, diesel, and mixtures thereof.

* * * * *